April 5, 1960
R. H. GOMS
2,931,750
METHOD OF MAKING A MOLDED OVERLAY PANEL
STRUCTURE OF LOW MOISTURE ABSORPTION
Filed Aug. 30, 1954
2 Sheets-Sheet 1
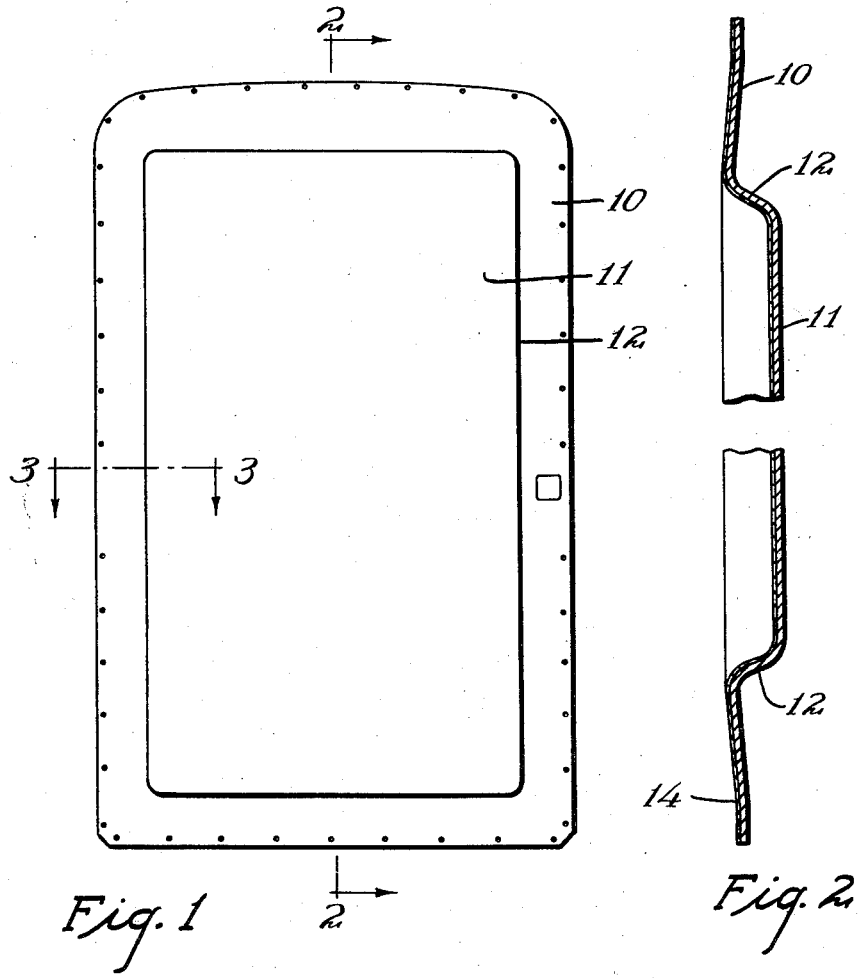
Fig. 1
Fig. 2
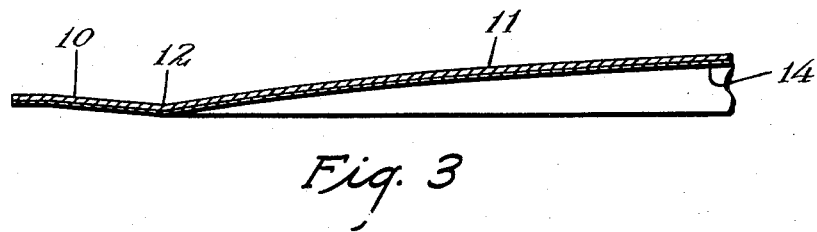
Fig. 3
INVENTOR
Richard H. Goms
BY
ATTORNEY April 5, 1960 R. H. GOMS 2,931,750
METHOD OF MAKING A MOLDED OVERLAY PANEL
STRUCTURE OF LOW MOISTURE ABSORPTION
Filed Aug. 30, 1954 2 Sheets-Sheet 2

INVENTOR
Richard H. Goms
BY
ATTORNEY

United States Patent Office 2,931,750
Patented Apr. 5, 1960

2,931,750

METHOD OF MAKING A MOLDED OVERLAY PANEL STRUCTURE OF LOW MOISTURE ABSORPTION

Richard H. Goms, St. Paul, Minn., assignor, by mesne assignments, to Whirlpool Corporation, a corporation of Delaware Application August 30, 1954, Serial No. 453,076

9 Claims. (Cl. 154—110)

This invention relates to an improvement in a combined moldable wood fiber and a plastic overlay sheet having improved higher tensile strength at low temperatures and deals particularly with an improved method of producing a water resistant composite body with high tensile strength at low temperatures of 0° Fahrenheit suitable for use under cold humid conditions as a domestic refrigerator or freezer door liner or the like, and the new product obtained by the improved method.

Refrigerator door liners have been produced of a variety of materials, each of which is capable of having a hard surface which is enameled or otherwise coated with a water resistant, acid resistant and chip resistant material. For example, compositions containing plastic resins and the like, have been molded to form panels which may be employed for the purpose. Most such materials are expensive and must be painted, enameled or otherwise surfaced to produce a finished product. An object of the present invention lies in the provision of an improved composite material having properties which improve over those of materials previously employed but are in an amount of fifty percent less expensive to produce and easier to form.

A feature of the present invention resides in the provision of a resin containing hard board material and a plastic impregnated overlay combination which is relatively water resistant and which will not pick up an excessive amount of moisture even when subjected to humid conditions at low refrigeration temperatures. The overlay material provides a hard finish which is difficult to scratch, chip or mar. As the material is less expensive than other materials capable of serving a similar purpose, the structure is economical and advantageous from a standpoint of production and handling.

A feature of the present invention resides in the provision of a material formed of wood fibers and resin having a sheet of overlay material simultaneously secured and bonded thereto. This material and its overlay are simultaneously secured and bonded thereto. This material and its overlay are simultaneously compressed under moisture, heat and pressure conditions which produce a shaped molded composite body of wood fibers and an overlay in a single pressing operation. The shapes formed may be from a slightly concave or convex to substantially right angles.

In the past, for door liners, it has been the usual practice to produce laminates consisting of paper sheets impregnated with a thermosetting resin by pressing these materials into a desired shape and form. In the present method, the starting material is a felted structure having a critical surface moisture content and having a surface thereof covered by a sheet of overlay material. During the forming operation, not only is the felted body and overlay combined and transformed into a hard plastic mass, but also the desired shape is formed. Thus, methods which in the past have required several steps for completion may now be finished in a single pressing operation.

A further feature of the present invention resides in the provision of a molded body of compacted material having a surface overlay thereupon which is bonded securely to the body and which is of substantially uniform body throughout the thickness of the structure. When sheet material is formed into a desired form, certain stresses and strains often occur in the body of the material due to the drawing operation of the molds. In the present structure, the material conforms to the contour of the mold cavity uniformly throughout its volume and the overlay sheet is simultaneously formed to fit each curvature thereof with virtually no danger of defects due to the molding operation because of the fact that the starting material is in a felted or relatively noncompacted condition.

An additional feature relative to obtaining a composite overlay hardboard is to provide a method of coating, a felted mat with a laid on or sprayed on resin plastic coating and then simultaneously compressing the mat by the process herein disclosed to obtain an overlay hardboard of improved appearance and other characteristics.

These and other objects and novel features of my invention will be more clearly and fully set forth in the following specification and claims.

In the drawings forming a part of the specification:

Fig. 1 is a side view of a refrigerator door panel;

Fig. 2 is a partially enlarged cross sectional view on line 2—2 of the panel shown in Fig. 1;

Fig. 3 is a partially enlarged cross sectional view on line 3—3 of Fig. 1;

Figure 4:
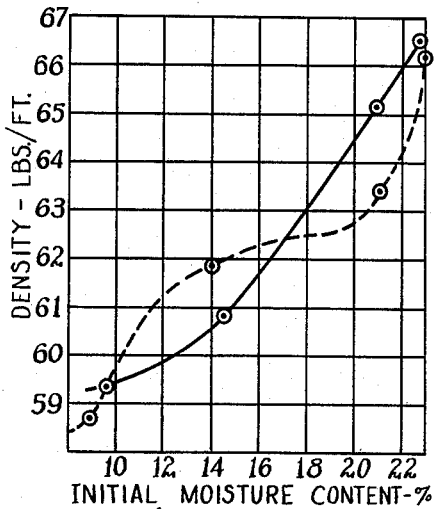
Figure 5:
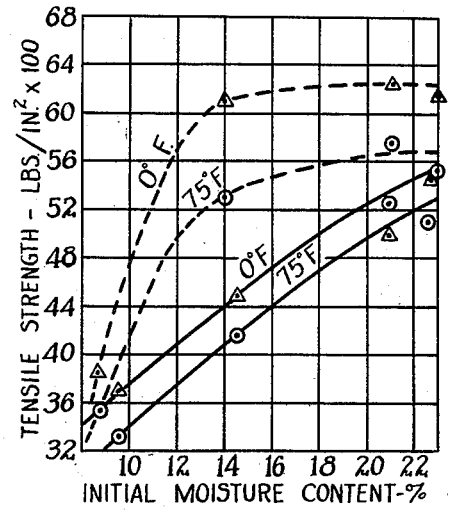
Figure 6:
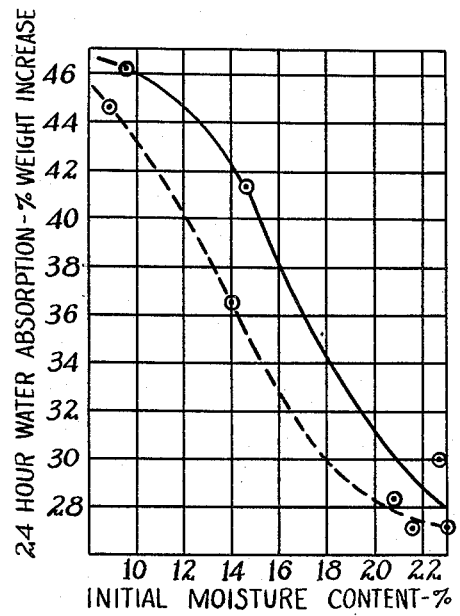

Figs. 4, 5, and 6, are graphic chart illustrations of panel properties relative to moisture content before compression.

In the production of refrigerators, a material commonly known as "Panelyte" is often used for door lining panels and the like. This material is provided with a hard body covered with an enamel or other suitable coating which is sprayed onto the surface. The material, itself, is quite costly to produce and the enameling process is also costly. Even when the enamel coating is sprayed onto the base material, the enamel may be scratched with compartive ease and when so scratched cannot be readily repaired.

In determining the material which should best be used, for the purpose, the unpainted "Panelyte" was compared with a product known as "Superboard," a hard pressed board containing resin material and "Tempered Masonite," another hard pressed board which is well known in the industry. Other materials were also tested, these materials being of the general types disclosed in Patent 2,571,986 of Earl G. Hallonquist. These flat sheets of hardboards as described in the patent, are formed by applying heat and pressure to a felt composition of wood fiber, wax and a binder which may be introduced in an alkaline aqueous solution of a phenolformaldehyde resin.

As a result of these tests, it was found that the last mentioned materials had certain properties which if processed in board formulation in combination with an overlay were better than those found in the other hardboards in all respects. The basic better quality was found to be the heat conductivity of this composition in the board state, and before being overlayed in the manner as herein described, was definitely lower than those of "Panelyte" and other commercial brands.

In view of the fact that the above described board materials were found to have better potential qualities than the other materials tested, several different formulas of these compositions were experimented with. The selected compositions contained from 2.5–7.0% of a thermosetting phenol-formaldehyde resin containing approximately 40% solids, and ranged from 10–40 pounds/cubic feet in density.

Certain physical properties of these compositions, as hardboards, compared with Panelyte and other hardboards are shown in Table I.

new alteration of present day methods of fabrication is necessary.

In considering a new process many attempts were made to improve the core stock and then paint or coat by conventional methods. These attempts have not been satisfactory and resulted only in refrigerator panel failures.

As indicated above, all attempts to improve the core stock, press and then paint or overly by known methods, with and without the use of adhesives, proved unsatisfactory as the composite material failed from the standpoint of avoiding moisture absorption, separation and high tensile strength at low temperatures.

Consequently, in order to obtain the required board strength, overlaying and molding characteristics while

TABLE I
Physical properties of various hardboards

| Material | Apparent Density, Lbs./ft.³ | K(Thermoconductivity, Btu.×in. hrs.×ft.²× °F.) | Bearing Strength, Lbs./in.² | Tensile Strength, Lbs./in.² (Normal Temp.) | Water Absorption, Percent Increase | | Humidity Observations | | | | | |
|---|---|---|---|---|---|---|---|---|---|---|---|---|
| | | | | | | | Percent Weight Increase | | | Percent Thickness Increase | | |
| | | | | | Wt. | Thickness | 1-day | 7-day | 14-day | 1-day | 7-day | 14-day |
| (A) Ligno Cellulose Fiber Approx. 95%, Wax and Binder Approx. 10% in a 1:3 ratio | 68.2 | 0.972 | 9,000 | 7,240 | 20.9 | 15.9 | 12.2 | 27.4 | 31.5 | 13.8 | 21.5 | 23.9 |
| (B) Ligno Cellulose 90%, Wax and Binder Approx. 10% in a 1:3 ratio | 72.2 | 0.910 | 10,810 | 7,670 | 16.0 | 12.8 | 10.2 | 21.9 | 23.2 | 12.2 | 17.9 | 20.4 |
| (C) Panelyte | 86.3 | 1.478 | ¹10,200 | 14,820 | 0.9 | 1.1 | 1.0 | 4.8 | 7.5 | 1.7 | 6.4 | 9.5 |
| (D) Superboard | 64.8 | 0.947 | 7,320 | 5,280 | 30.4 | 13.6 | 13.0 | 45.8 | 50.5 | 11.5 | 28.3 | 30.7 |
| (E) Tempered Masonite | 65.0 | 1.095 | 6,040 | 4,080 | 9.5 | 6.4 | 9.0 | 20.7 | 26.5 | 8.4 | 12.4 | 13.7 |

¹ Published value for "with grain" direction.

Thermal conductivity was determined by means of a Cenco-Fitch apparatus using boiling water in the source vessel. A copper-constantan thermocouple was connected to the receiver plug and source vessel, and the rate of heat flow through the various materials determined by means of a micro-ammeter. The change in temperature with respect to time was then converted to thermal conductivity factors by means of the calculus.

Ultimate bearing strength was determined on the Dillon tester by pulling a rod $^{11}/_{64}$ inch in diameter through a hole $^{11}/_{64}$ inch in diameter, the center of which was ¼ inch from the sample edge. This hole size and location is similar to those drilled in the freezer breaker strips.

Two samples approximately 6 x 12 inches were cut from each of the materials for density determinations. Although no conditioning was done prior to the measurements, all samples have been exposed to ambient conditions for several weeks and were considered to be at equilibrium conditions for all practical purposes.

After the densities had been determined, the same samples were placed in the humidity cabinet at one hundred percent R.H. and 110° F. for several days. Periodic measurements were taken as indicated in Table I.

Tensile strength was determined in the conventional manner according to A.S.T.M. method D638–44T.

Water absorption was determined according to A.S.T.M. method D570–42 for twenty-four hours immersion.

The results of Table I indicate that, in general, the compared hardboards are equal to or better than the other fiber board products particularly with respect to tensile and other strength properties. Water resistivity of the fiber boards is rather poor as evidenced by both immersion and humidity type exposures. Panelyte is seen to have good strength and water absorption values, but a rather high thermal conductivity factor.

Inasmuch as the results obtained from the above physical analysis of the different boardstock shows that they do not have all the desired physical properties particularly with regard to heat conductivity, water absorption, humidity resistance, and surface qualities, a completely avoiding discoloration, blistering, warping and other bad features, in a combined operation, it was necessary with new technique to develop a better board in a combined process utilizing the raw materials selected as most promising. This combined process involved the problems of many variables as moisture, time, pressure, and temperature, both with respect to the raw felt and the overlay.

In general it was discovered that the overlay materials in combination with control of felt moisture are controlling factors with regard to the process. For example, the overlay material used in the following example is a diallylphthalate impregnated alpha cellulose paper and the felt is a lignocellulose mat obtained by the process of felting and impregnating with wax and binder as heretofore indicated. Other overlay materials of this character include plain or colored rayon paper, cotton fibers, glass fibers, alpha cellulose and kraft papers and synthetic fibers such as Dacron and Orlon, or other like materials which do not soften at temperatures in the range of 300° F. to 350° F. These paper and fibrous materials are impregnated with thermosetting resins, such as diallylphthalate polymer and prepolymer, unsaturated polyesters containing either styrene, vinyl toluene, or diallylphthalate monomers, and melamine resins. The degree of impregnation of the carriers should be within the range of from 50% to 95% by weight of resin. The percentage of impregnation is based upon the variable weight of the carriers, for example, the glass fiber sheet per sq. ft. weigh only about 2 grams or otherwise is a 30 mil glass fiber overlay and the rayon sheets, for example, weigh about 6 grams.

In order to obtain a homogeneous composite appearing panel board for refrigeration doors or breaker strips, as disclosed in Figures 1, 2, and 3, wherein the contour and appearance of the molded piece is uniform throughout the fastening edge portions 10, center section 11, and intermediate curved or bent sections 12, with a closely adhering overlay 14, it was determined that an initial felt moisture content of between about 5% to about 10%, with uniform distribution, is a critical condition and that an additional increase by spraying to at least 11% and in excess of 30% total moisture content was required in a resin impregnated felt of the types selected to obtain an effective overly. In certain instances a critical range of 20% to 30% added moisture is required to obtain a good refrigerator panel board in combination with required physical properties of the core. The distribution of the additional surface moisture was determined to be necessary and most beneficial when applied approximately ten percent on the overlay side and ninety percent on the back or screen side in a one side overlay process.

In order to point out more specifically and identify a resultant product with the process, a lignocellulose felt is prepared with a phenol-formaldehyde resin and wax in a 1 to 1 ratio, as indicated by (A) in Table I. This prepared felt, conditioned in a circulating air oven maintained at room temperature for approximately sixteen hours to obtain an initial moisture content of nine and five-tenths percent, was used as a core stock. In felt compositions of this character the moisture addition is found to be critical in the range of about twenty percent to thirty percent for refrigerator door panel structures. A moisture content of less than twenty percent does not provide the required plasticization for uniform molding and obtaining of the required physical properties necessary for a refrigerator door panel or breaker strip, and moisture in excess or amounts of over thirty percent produces undesirable water squeeze-out during pressing as well as ineffective overlaying.

This core stock is sprayed on both sides until a moisture content of between twenty percent to thirty percent is obtained. For example, if a total moisture content of twenty-five percent is desired, the impregnated felt having an original moisture content of, say ten percent, is surface sprayed with an additional fifteen percent. This additional surface spray is applied in the proportions of approximately ten percent spray on the front or overlay side and ninety percent spray on the back or screen side. A linen paper impregnated with approximately seventy-five percent diallylphthalate is then laid over the core side provided with the approximate ten percent spray and the core and overlay are placed in a hot press mold with the back side resting on a screen of 16 mesh wire. A paper or other overlay sheet material is impregnated by dipping into a liquid resin of approximately 300 cps. when no filler is used and the resin impregnated sheet is partially cured for thirty minutes at one hundred ten degrees F. before being laid over the core and pressed. A dip solution, for example, is prepared by a mix of diallylphthalate composed of eighty-five percent polymer and fifteen percent monomer in fifty percent acetone. At times, a two dip processing is used when the viscosity is lower and an excessive run-off occurs, or the carrier is not sufficiently filled. The screen eliminates surface roughness and preliminary overlay blistering. The screen sizes may be varried between a 16 mesh to an 8 mesh or a combination of mesh sizes may be used.

Regarding the press cycle it was necessary to develop a press technique to obtain proper hardness and overlay adhesion, with the overlay being a controlling factor with regard to total press time for obtaining a refrigerator door panel or breaker strip having the improved physical properties, as described.

This press cycle is very critical, within the limits defined herein, relative to obtaining adhesion of the overlay with the required property of low moisture absorption at refrigeration temperatures. In general, the press cycle is applied with the mold heated to an operating temperature of three hundred degrees F.–three hundred fifty degrees F. in the following manner:

Apply operating pressure of 300–1000 pounds per square inch and immediately reduce to contact pressure. This requires approximately thirty seconds. Retain contact pressure for from about fifteen seconds to one minute. Increase pressure to 300–1000 pounds per square inch and maintain for from 1 to 9 minutes. Total time 2 to 10 minutes dependent upon the rate of cure time of the resin contained in the overlay.

In operating the press at three hundred pounds pressure rather than one thousand p.s.i. pressure, an overlayed board of slightly lesser density is produced with a slight sacrifice in tensile strength. For a diallylphthalate impregnated overlay sheet prepared by dipping and saturating the sheet in an acetone solution (fifty percent by weight) of eighty-five percent polymer and fifteen percent monomer, the optimum overlay cure is developed in approximately a total time of eight minutes at three hundred degrees F. In general, higher temperatures of three hundred fifty degrees F. and above embrittle the core stocks and discolor the overlay. Temperature variations within a range of two hundred fifty degrees to three hundred fifty degrees F. appeared satisfactory except that the time required for optimum overlay cure increases about one-half to two minutes with decreasing temperature to two hundred fifty degrees F. The retension of contact pressure immediately after the first application of operation is for one minute.

Best overlay adhesion appears to improve with the higher pressure up to 700 p.s.i. and no great difference is observable from 700 p.s.i. to 1000 p.s.i. The overlay adhesion is more dependent on felt moisture content and breathe cycle.

The water addition to type core, (B) of Table I, can be reduced to obtain an overlay sheet. This reduction may range after water addition from eleven percent to thirty percent and preferably between thirteen percent to sixteen percent if applied in the proportions of approximately ten percent sprayed on the one side to which the overlay is added and approximately ninety percent sprayed on the back side. The overlay and the press procedure are substantially the same as for the (A) type, heretofore described. The time of the contact pressure and the closing pressure may be increased for one-quarter and one-half minute respectively. Further, with the indicated overlay sheet applied in the manner as described, the indicated process appears to require approximately six minutes at three hundred degrees F. in order to develop good adhesion, and optimum cure at three hundred degrees F. is developed in a total of approximately eight to nine minutes at about 700 p.s.i.

As illustrated by the following table of tests for overlay boards the optimum strength properties are reached in four to six minutes and the time of pressing is significant particularly with regard to tensile strength:

TABLE II

*Effects of press time on overlay board properties*[1]

PHYSICAL PROPERTIES

| Material | Time of Pressing, Min. | Density, lbs./ft.$^3$ | Tensile Strength, lbs./in.$^2$ | Izod Impact, ft./lbs./in. of notch |
|---|---|---|---|---|
| (A) as per Table I | 2 | 59.3 | 3,400 | 0.9 |
|  | 4 | 60.6 | 5,200 | 0.8 |
|  | 6 | 60.3 | 4,500 | 1.0 |
|  | 8 | 60.7 | 4,300 | 0.9 |
|  | 10 | 56.0 | 3,600 | 0.9 |
| (B) as per Table I | 2 | 61.2 | 4,500 | 0.5 |
|  | 4 | 61.7 | 6,200 | 0.6 |
|  | 6 | 63.7 | 6,200 | 0.5 |
|  | 8 | 64.4 | 4,900 | 0.5 |
|  | 10 | 60.3 | 4,900 | 0.5 |

[1] The following press schedule was used: (a) Felt moisture (B) 20–25%; (A) 25–30%. (b) Temperature=300° F. (c) Pressure=700 p.s.i. (d) Total time=as indicated (1½ min. breathe for all boards).

It is to be noted that the tensile strength measured under normal temperature conditions decreases and is not improved with increased time of pressing after the most critical period of four to six minutes. The pressing time of two minutes for the above type resins is not suitable for refrigerator panels but will obtain an overlay which may be otherwise useful.

A further comparison of the board tensile strength at specific temperatures surprisingly disclosed a relative increase in tensile strength at 0° F. when the felt, moistened ten percent front to ninety percent back, in the manner heretofore described, is pressed under relative optimum time, pressure and temperature conditions. This comparative increase is indicated in an approximate average value as follows:

TABLE III

| Molded Board | Density, lbs./ft.³ | Tensile, lbs./in.² 75° F. | Strength, 0° F. |
|---|---|---|---|
| (A) | 66.8 | 4,700 | 5,120 |
| (B) | 68.6 | 6,430 | 7,830 |

With a variation in felt moisture on pressed board physical properties the following indicates a comparison value:

TABLE IV

| Molded Board | Density | Moisture Content | | Tensile Strength | |
| | | before spray | after spray | 75° F. | 0° F. |
|---|---|---|---|---|---|
| (A) | 65.3 | 9.6 | 26.0 | 5,770 | 6,180 |
| | 64.2 | 14.5 | 25.6 | 5,190 | 5,340 |
| (B) | 65.9 | 8.9 | 25.2 | 6,480 | 6,650 |
| | 64.4 | 14.0 | 25.3 | 6,070 | 5,650 |

It will be noted from the above that upon an increase in testing temperature to seventy-five degrees F. and with a relatively higher original felt moisture content the tensile strength decreases in contrast to the limits of control herein set forth to provide a uniformly molded board with an overlay with the improvement in tensile strength and low percentage of moisture absorption required under conditions of refrigerating temperatures. That is, at higher initial moisture content the tensile strength is decreased.

To show how the required addition of surface moisture to the felt base is necessary the following effects of felt moisture on moldability without an overlay are illustrative:

From the above table, it is shown that the board B, which contained the moisture content of 22.8 percent (absorbed under artificial humid conditions), obtained the most successful appearing results among the unsprayed samples. However, the formed board did not rate as satisfactory and did not have an apparent homogeneity. Only the boards having an initial moisture content not over about ten percent with an added spray within the range as herein set forth obtained a satisfactory result. To overlay the board with the fifteen percent initial moisture content, as illustrated in the above Table V, the finished product was blistered and unsatisfactory.

Concerning the average felt density in pounds per foot relative to moisture content prior to pressing, the graph disclosed in Fig. 4 illustrates that both the (A) board in solid line, and (B) board in the dotted line, reach an approximate maximum density at slightly over a twenty-two percent moisture content. This relative density remains substantially proportionately constant above the limits of approximately twenty percent moisture content relative to overlay, adherence is obtained up to a thirty percent moisture content in the process as described.

With respect to general board improvement of tensile strength relative to moisture content the graph in Fig. 5 illustrates that as the initial addition of moisture is increased from approximately nine percent the increase in tensile strength gradually levels off. With a low moisture content the relative tensile strength is proportionately low. A sharp rise in the curve indicates the increase obtained by addition of moisture from approximately ten percent up to twenty-three percent. The limits of adding moisture up to approximately thirty percent are controlled by good overlay adhesion in the time, temperature and pressure called for in the process described.

An average of the weight increase by water absorption characteristics of the formed board relative to control of the moisture content before pressing is illustrated by the graph shown in Fig. 6. This graph illustrates the advantages obtained by the indication of the results of the twenty-four hour test (per ASTM method previously described) of the weight increase due to absorption of moisture. As indicated, the (A) and (B) boards compressed as herein set forth show a decided drop in their water absorption characteristics when the moisture content of the felt is first controlled, as indicated within the limits starting at approximately within the range of twenty percent. The weight increase from twenty percent to fifty percent moisture content is reduced to a minimum at this stage with the best results in obtaining

TABLE V

*Effects of felt moisture on moldability*

| Material | Moisture Content, Percent | | Moldability Characteristics | | | | |
| | Initial | After Surface Spraying | Visible Cracks | Starved Areas, Percent of Total | Apparent Homogeneity | Surface Appearance and Feel | Degree of Plasticization |
|---|---|---|---|---|---|---|---|
| (A) | 9.9 | | Large | 100 | Good | Smooth | Insufficient. |
| | 13.7 | | ...do | 100 | Fair | ...do | Do. |
| | 21.2 | | Incipient | 75 | Poor | Rough | Do. |
| | 22.2 | | ...do | 50 | ...do | ...do | Do. |
| | 9.5 | 24.5 | None | 0 | Good | Smooth | Sufficient. |
| | 15.0 | 24.1 | ...do | 0 | ...do | ...do | Do. |
| | 9.9 | 52.0 | ...do | 0 | ...do | ...do | Excessive. |
| (B) | 8.8 | | Incipient | 100 | ...do | ...do | Insufficient. |
| | 12.5 | | None | 50 | Poor | Rough | Do. |
| | 19.4 | | ...do | 25 | ...do | ...do | Do. |
| | 22.8 | | ...do | 0 | Mottled | Smooth | Sufficient. |
| | 8.8 | 24.0 | ...do | 0 | Good | ...do | Do. |
| | 15.0 | 25.0 | ...do | 0 | ...do | ...do | Do. |
| | 9.5 | 49.7 | ...do | 0 | ...do | ...do | Excessive. |
| | 15.0 | 48.8 | ...do | 0 | ...do | ...do | Do. | an overlay board of having the required properties and appearance, by the method as described herein.

A further indication of the effects of moisture and forming variables on overlaying is indicated from the following results as shown in Table VI:

TABLE VI

*Effects of moisture and forming variables on overlaying [1]*

| Material | Board Number | Forming Variables | | | | Observations |
|---|---|---|---|---|---|---|
| | | Operating Pressure | Moisture Content after surface spraying—Total, Top and Bottom, Percent | Time at Contact Pressure, Min. | Overlay Material | |
| (A) | 23 | 700 | 14.4 | 1 | Green | Good Board. |
| | 25 | 700 | 16.6 | 1 | do | Do. |
| | 36 | 500 | 16.6 | 1.5 | Red | Do. |
| | 45 | 500 | 14.4 | 1.5 | Glass | Do. |
| | 30 | 700 | 11.4 | 1.5 | Glass and Red | Do. |
| (B) | 32 | 500 | 11.4 | 1.5 | Red | Do. |
| | 40 | 500 | 13.6 | 1.5 | Glass | Do. |
| | 43 | 500 | 13.6 | 1.5 | do | Do. |
| | 41 | 300 | 13.6 | 1.5 | Green | Soft core—good overlay. |

[1] Within practical limits, physical dimensions (i.e. 48 x 48 inches), basis weight, felt density and initial moisture content (i.e. (A) 9.5%, (B) 9.0%).

Having set forth in specific detail the method and production of composite overlay boards with a clear type resin, the following is illustrative of composite dip solutions for providing carriers with color impregnated for making an opaque or color overlay fiberwood:

FORMULA D

40%–75% unsaturated polyester resin with styrene, diallylphthalate, or vinyl toluene (viscosity 1500–75,000)
40%–75% magnesium silicate filler
10%–15% colorpaste with or without tint:
    60% $TiO_2$
    40% inert material (bentonite)
1½%–2% catalyst:
    1 benzoyl peroxide to 1 tricresyl phosphate
Sufficient acetone solvent to give a dipping viscosity (dependent on the carrier) of 100–450 cp., as determined by the Brookfield viscometer.

The carriers illustrative of the different viscosities required are, for example, 10 mil to 30 mil glass fibrous sheets 100; rayon 450; cotton linter 150, and cottons 450. These materials are given one or more dips in the composition formed to provide them with an increase in coated weight of from about 43% to 95%. A pretreatment of the fiber glass with about a 10% resin acetone mixture before dipping produces a better adherence of the resin filler-pigment mixture. The resin is the basic material as herein indicated in the examples.

More specifically a cotton linter is dip coated with the following mixture as illustrated:

FORMULA E 100 grams polyester resin viscosity 350 cps.
75 grams magnesium silicate
15 grams colorpaste
2 grams catalyst
Acetone solvent to 150 viscosity The dipped sheet material is air dried for about 12–24 hours to remove acetone before being laid over the prepared premoistened felt mat and pressed by the process as herein described. The A and B type mats are sprayed with water until a moisture content within the ranges indicated are obtained.

Suitable fillers, as a substitute for magnesium silicate are expanded silica, bentonite and diatomaceous earth. The filler addition is a controlling factor for the stoppage of flow relative to dipping and in the process of pressing.

The polyester as a specific example may be a combination of the reaction mixture of maleic anhydride and ethylene glycol with a monomer diallylphthalate added in approximately an equal proportion. Other unsaturated combination mixtures may be maleic anhydride and propylene glycol, phthalic anhydride and ethylene glycol, succinic acid and allyl alcohol and such mixtures of these and like ingredients of one or another of unsaturated acids and alcohols, or both being unsaturated to produce the polyester. Other monomers which may be added to the unsaturated polyester are vinyl acetate and triallyl cyanurate in addition to those already mentioned.

With regard to a different method of obtaining, an overlay fiber board as a painting base yet utilizing the press process heretofore described, spray compositions are formulated and sprayed onto felted backing, as herein described, provided with only a backside moisture addition of from 10% to 15% over the uniformly distributed 5% to 10% of the initial moisture condition. This additional moisture provides the felted base with a total of 20% to 25% moisture content.

Illustrative spray compositions are:

FORMULA F

80% polyester resin (viscosity 600–900 cp., long shelf life and known as GE 3405 a rubber-like resin with 35% solids)
20% mixture:
    70% toluene
    30% ethanol
1½% t-butyl perbenzoate (catalyst)

By long shelf-life it is meant that after catalyst is added the resin will not set up, for at least four months, on standing under normal conditions.

Or,

FORMULA G

60% diallylphthalate monomer, viscosity 200,000 cp. (known as Interchemical 638)
40% magnesium silicate
2% catalyst 1:1 ratio benzoyl peroxide and tricresyl phosphate
40% solvent (acetone)

With respect to Formula F above, a color and filler composition may be formulated by mixing components in the ratio of approximately a sixty percent polyester resin, forty percent filler, and ten percent color paste and the other ingredients as indicated.

The above spray compositions are applied on the prepared fiber mat, as described, as a sprayed on uniform coating at an average weight deposit of 25–30 grams per sq. ft. With the viscosity of the resin composition reduced, several sprayings may be required to obtain the weight indicated. The sprayed felt is pressed immediately after spraying or may stand or be heated to two hundred fifty degrees F. for a few minutes, as a precaution, until the solvent evaporates and then the felt mat with its overlay coating of resin is pressed in the manner as herein described. For example, the breathe time is for a period of from fifteen seconds to thirty seconds and the final total press and cure time is from approximately 3 to 10 minutes at a pressure of 700 p.s.i. and a temperature of three hundred degrees F.–three hundred fifty degrees F. The overlay of the specific compositions described are given a quick operating press at 700 p.s.i. at about three hundred twenty-five degrees F., contact pressure fifteen seconds and final operating press of six minutes or a sufficient time to obtain a Barcol hardness of between approximately 42 to 60, or better.

Illustratively, the B type felt, density 15–20 pounds per ft.³ and having a 7.8% (dry basis) moisture content, sprayed on the back side with approximately an addition of ten percent by weight of water when coated with a polyester resin, of the character herein described with or without, for example, being in combination with a diallylphthalate or styrene monomer in the range of from 22% to 50%, with or without filler, as indicated, is pressed by the following schedule:

(1) A pressure of 700 p.s.i. applied.
(2) Pressure immediately reduced to 20 p.s.i. for 15 seconds.
(3) The breathe time between initial application of pressure and reapplication of pressure in the next step varies between 30 seconds and 2 minutes.
(4) Pressure 700 p.s.i. applied and varied for a total press time varied between 3 minutes and 10 minutes.

The press temperature maintained at an approximate average of 325° F. within a range of plus or minus about 25° F. The total time of cure within the range as is indicated, is dependent upon the relative properties of the particular overlay resin material used. Such relative properties are determined by the smoothness and hardness desired in the finished product which serves as a base for painting with an alkyd resin or rubber base paint and refrigerator enamels. Preferable, when the diallylphthalate and styrene polyester resins are utilized about 40% addition of magnesium silicate or other filler is added, by stirring or milling, to prevent resin flow and possibly resultant rough and porous finished surfaces. With the added filler, a wetting or release agent which prevents sticking of the press is used. As indicated, in some instances the factor of obtaining sufficient flow without excess flow under the molding process may be controlled by the addition of filler and also, to a lesser extent, by a cold press of the felt to partially increase its density and correspondingly partially compact the fibers.

In the pressing operation it is preferred, to insure release and obtain gloss, that the caul be pretreated by coating with a wetting or releasing agent as ortholeum (an organic phosphate) silicon, aquaday or carnauba wax and like compositions, and admixtures containing the same which may be purchased as wetting agents. With respect to the spray on type overlay sheet which is to be subsequently coated, for example, with an alkyd resin base paint or any refrigerator enamel used on panelyte with the usual primer coating the coating of the caul with a silicone release agent is avoided as apparently the after-coating is affected. In this instance the other type release agents are used.

By following the procedure as herein described with the materials indicated there is provided a formed and a molded article which exhibits a most pleasing and expensive appearing finish over its exposed surface. The structure is a compact uniformly coated or painted sheet material useful as a substitute for present panel materials. Particularly, when the preferred structures, as indicated, are provided with a wax coating composition, there is provided a new and improved hard sheeting useful as refrigerator door panels and breaker strips.

In addition to the molded form a composite panel sheet of the material herein described with or without additional covering coatings may be pressed to form a useful substitute for other panel structures.

In accordance with the patent statutes, the principles of construction and operation of the overlay fiber board and method of making the same have been described and while it has been endeavored to set forth the best embodiment thereof, it is desired to have it understood that obvious changes may be made within the scope of the following claims without departing from the spirit of the present invention.

I claim:

1. The method of making a molded overlay panel having a low moisture absorption characteristic and improved tensile strength at low temperatures of 0° F. comprising the steps of providing a prepared lignocellulose felt with a moisture content of between approximately five percent to ten percent, spraying said felt with an added amount of moisture until the total content ranges from eleven percent to thirty percent moisture content in the approximately added amounts of about ten percent on one side and about ninety percent on the opposite side, laying a sheet material impregnated with approximately fifty percent to nine-five percent by weight of resin on the ten percent sprayed side of said felt, placing the said felt and resin impregnated overlay in a mold heated to approximately 250°–350° F., immediately applying the press to operating pressure of from three hundred to one thousand pounds per square inch, immediately reducing the pressure to contact pressure, retaining contact pressure for a period of approximately from fifteen seconds to one minute, and reapplying operating pressure for approximately two to ten minutes.

2. In the method of claim 1, the steps of heating the mold to approximately two hundred fifty degrees to three hundred fifty degrees F. and maintaining the final stage of operating pressure for approximately six and one-half to eight minutes.

3. The method of making a molded overlay panel having a low moisture absorption characteristic and improved tensile strength at low temperatures of 0° F. comprising the steps of drying a prepared lignocellulose felt to a moisture content of between approximately nine percent to nine and five-tenths percent, spraying said felt with additional moisture to obtain from about twenty percent to thirty percent total moisture content with the additional moisture added in the approximate amounts of ten percent on one side and ninety percent on the opposite side, laying a sheet material impregnated with about fifty percent to nine-five percent by weight resin on the approximate ten percent sprayed side of said felt, placing the said felt and resin impregnated overlay in a mold heated to approximately three hundred degrees F., immediately applying the press to operating pressure of about one hundred pounds per square inch, immediately reducing the pressure to contact pressure, retaining contact pressure for a period of one minute, and reapplying operating pressure for approximately six and one-half minutes.

4. The method of making a molded overlay panel having a low moisture absorption characteristic and improved tensile strength at low temperatures of 0° F. comprising the steps of drying a prepared lignocellulose felt to a moisture content of between approximately nine percent to nine and five-tenths percent, spraying said felt with from thirteen percent to sixteen percent additional moisture in the approximate amounts of ten percent on one side and ninety percent on the opposite side, laying a sheet material impregnated with over fifty percent by weight resin on the approximate ten percent sprayed side of felt, placing the said felt and resin impregnated overlay in a mold heated to approximately three hundred degrees F., immediately applying the press to operating pressure of from three hundred to seven hundred pounds per square inch, immediately reducing the pressure to contact pressure, retaining contact pressure for a period of about one and one-quarter minutes, and reapplying operating pressure for approximately six and one-half to eight minutes.

5. The method of making a molded overlay panel for refrigerators having a low moisture absorption characteristic and high tensile strength at 0° F. comprising conditioning a prefabricated lignocellulose felt containing a thermosetting resin with a moisture content of between five percent and ten percent, surface spraying said felt with water until the total moisture content is within the range of eleven percent to thirty percent with about ten percent of the added moisture sprayed onto the overlay side and about ninety percent of the added moisture sprayed onto the backside opposite the overlay side, laying a sheet material impregnated with a different thermosetting resin than said first mentioned thermosetting resin onto the said overlay side of said felt, applying a quick pressure of three hundred to one thousand pounds per square inch in a heated mold to the felt and overlay, immediately reducing the quick pressure to substantially contact pressure for a period of from fifteen seconds to about one minute, and reapplying operating heat and pressure for from two to ten minutes.

6. The method of making an overlay panel structure comprising the steps of surface spraying one side of a resin impregnated lignocellulose prefabricated felt having an uniform water content ranging from five percent to ten percent with additional water until the total moisture content is increased to from about twenty percent to twenty-five percent, spraying a thermosetting resin coating over the opposite side of said felt until a uniform deposit of from about twenty-five to thirty grams per square foot is obtained, momentarily pressing the sprayed felt under an operating pressure of between three hundred pounds and one thousand pounds per square inch and a temperature of about three hundred degrees F. to three hundred fifty degrees F., immediately releasing the pressure to from 20 p.s.i. to substantially contact pressure for a period of from fifteen seconds to two minutes, and reapplying the operating heat and pressure for a period of from three minutes to ten minutes.

7. The method of simultaneously producing a molded composite laminate overlay panel comprising the steps of uniformly drying a lignocellulose felt core stock sheeting to a moisture content of about nine percent, spraying additional moisture onto one side of the said felt to increase the moisture content to from about twenty percent to about twenty-five percent, spraying a resin and coating composition onto the felt over the side opposite the added moisture spray until a weight increase of from about forty-three percent to ninety-five percent is obtained, quick pressing the resin coated felt at an operating pressure of about seven hundred pounds per square inch, and at a temperature of about three hundred twenty-five degrees F., immediately releasing the pressure to substantially press contact pressure for at least fifteen seconds, and reapplying operating pressure for a time sufficient to obtain a Barcol hardness of at least 42.

8. In the method of claim 7 the step of reapplying the operating pressure for a total time of from about three minutes to ten minutes to obtain a Barcol hardness of between approximately 42 to 60.

9. The method of making a composite molded overlay panel comprising conditioning a prepared lignocellulose felt core stock with a moisture content of about five percent to ten percent, surface spraying said felt with water to increase the moisture content on at least one side of said core stock to at least about 10% and on the other side in an amount not exceeding a total addition of on the order of thirty percent, applying a resinous coating overlay material on the side of the felt core having the lower moisture content, placing the said prepared coated felt core stock in a mold heated to approximately 250°–350° F., momentarily applying operating pressure of from three hundred to one thousand p.s.i., immediately reducing the pressure to 20 p.s.i. and to contact pressure, retaining the reduced pressure for a period of approximately from fifteen seconds to two minutes and reapplying operating heat and pressure for approximately two to ten minutes.

References Cited in the file of this patent

UNITED STATES PATENTS

| 1,465,215 | Hall | Aug. 14, 1923 |
|---|---|---|
| 1,905,999 | Ellis | Apr. 25, 1933 |
| 2,268,477 | Elmendorf | Dec. 30, 1941 |
| 2,276,035 | Guhl | Mar. 10, 1942 |
| 2,292,118 | Guhl | Aug. 4, 1942 |
| 2,321,938 | Quinn | June 15, 1943 |
| 2,366,484 | Bradner | Jan. 2, 1945 |
| 2,435,209 | Elmendorf | Feb. 3, 1948 |
| 2,562,711 | Gessler | July 31, 1951 |
| 2,571,986 | Hallonquist | Oct. 16, 1951 |
| 2,612,445 | Spence | Sept. 30, 1952 |
| 2,631,960 | Dafter | Mar. 17, 1953 |
| 2,658,847 | MacDonald | Nov. 10, 1953 |
| 2,686,143 | Fahrni | Aug. 10, 1954 |
| 2,700,796 | Roman | Feb. 1, 1955 |
| 2,835,622 | Clark | May 20, 1958 |

FOREIGN PATENTS

| 472,441 | Canada | Mar. 27, 1951 |

UNITED STATES PATENT OFFICE

CERTIFICATE OF CORRECTION

Patent No. 2,931,750                                          April 5, 1960

Richard H. Goms

It is hereby certified that error appears in the printed specification of the above numbered patent requiring correction and that the said Letters Patent should read as corrected below.

Column 12, line 27, claim 1, and line 53, claim 3, for "nine-five", each occurrence, read -- ninety-five --.

Signed and sealed this 10th day of January 1961.

(SEAL)
Attest:

KARL H. AXLINE                                          ROBERT C. WATSON
Attesting Officer                                     Commissioner of Patents